(12) United States Patent
Jang et al.

(10) Patent No.: US 8,149,920 B2
(45) Date of Patent: Apr. 3, 2012

(54) DEVICE AND METHOD FOR MERGING CODECS

(75) Inventors: Euee-S Jang, Seoul (KR); Sun-Young Lee, Seoul (KR); Chung-Ku Lee, Incheon (KR)

(73) Assignee: Humax Co., Ltd., Seongnam-Si (KR)

( * ) Notice: Subject to any disclaimer, the term of this patent is extended or adjusted under 35 U.S.C. 154(b) by 1035 days.

(21) Appl. No.: 12/083,071

(22) PCT Filed: Dec. 14, 2005

(86) PCT No.: PCT/KR2005/004280
§ 371 (c)(1),
(2), (4) Date: Apr. 3, 2008

(87) PCT Pub. No.: WO2007/040297
PCT Pub. Date: Apr. 12, 2007

(65) Prior Publication Data
US 2009/0161767 A1    Jun. 25, 2009

(30) Foreign Application Priority Data
Oct. 6, 2005    (KR) .................. 10-2005-0093737

(51) Int. Cl.
*H04N 7/12* (2006.01)
(52) U.S. Cl. ................................. 375/240.24
(58) Field of Classification Search ............. 375/240.01, 375/240.24, 240.25
See application file for complete search history.

(56) References Cited

U.S. PATENT DOCUMENTS

| | | | | |
|---|---|---|---|---|
| 5,987,171 | A | * | 11/1999 | Wang ........................... 382/173 |
| 6,862,320 | B1 | * | 3/2005 | Isu et al. .................. 375/240.27 |
| 6,965,328 | B2 | * | 11/2005 | Ji .................................... 341/50 |
| 2003/0185306 | A1 | * | 10/2003 | MacInnis et al. ........ 375/240.25 |
| 2004/0140916 | A1 | | 7/2004 | Ji |

FOREIGN PATENT DOCUMENTS

| | | |
|---|---|---|
| JP | 7-30763 A | 1/1995 |
| JP | 9-200767 A | 7/1997 |
| WO | WO-99/22524 A | 5/1999 |
| WO | WO 2004/045079 A2 | 5/2004 |

OTHER PUBLICATIONS

Tsai, Introduction to Video Coding Tools Repository (VCTR), ISO/IEC JTC 1/SC 29/WG11 N7332, 3 pages, Jul. 2005.*

(Continued)

*Primary Examiner* — Frank Duong
(74) *Attorney, Agent, or Firm* — Birch, Stewart, Kolasch & Birch, LLP

(57) ABSTRACT

A unified codec device and a method thereof are disclosed. The unified codec device in accordance with an embodiment of the present invention comprises a decoding control unit, which sets a connection relation of functional units by interpreting connection information from an inputted universal bitstream or data, and a functional group, which consists of a plurality of functional units and in which functional units corresponding to a sequential start control of the decoding control unit are sequentially activated to process a bitstream or the data, using the control parameter, to output the inputted bitstream as image data. Using the functional unit recombination technique in accordance with the present invention, the bitstreams based on various decoding standards can be encoded/decoded without restriction.

15 Claims, 18 Drawing Sheets

OTHER PUBLICATIONS

Tung et al, DSP-Based Multi-Format Video Decoding Engine for Media Adapter Applications, IEEE, 8 pages, 2005.*

Asai et al, Study of Video Coding Tool Repository (Version 3.0), ISO/IEC JTC1/SC29/WG11, 12 pages, Jan. 2005.*

Partial English language translation of JP-9-200767-A, dated Jul. 31, 1997.

Asai et al., "Study of Video Coding Tool Repository (Version 3.0)," International Organisation for Standardisation Organisation Internationale De Normalisation ISO/IEC JTC1/SC29/WG11 Coding of Moving Pictures and Audio, Jan. 2005, 11 pages.

Jang et al., "Hanyang/Humax Contribution to VCTR," International Organisation for Standardisation Organisation Internationale De Normalisation ISO/IEC JTC1/SC29/WG11 Coding of Moving Pictures and Audio, Oct. 2004, 20 pages.

Jang et al., "VCTR Textual Description V2.0," International Organisation for Standardisation Organisation Internationale De Normalisation ISO/IEC JTC1/SC29/WG11 Coding of Moving Pictures and Audio, Jan. 2005, 19 pages.

Rutten et al., "Application design trajectory towards reusable coprocessors MPEG case study," Embedded Systems for Real-Time Multimedia, Estimedia 2004, 2nd Workshop on Stockholm, Sweden, Sep. 6-7, 2004, pp. 33-38, XP010742649.

Zhang et al., "A framework for dynamically reconfigurable video codec using multiple coding tools," Proceedings of SPIE—The International Society for Optical Engineering, vol. 3408, 1998, pp. 528-537, XP-002578167.

* cited by examiner

FIG. 6

| Index | FU name | FU description |
|---|---|---|
| A | NALP | Network Abstraction Layer Parsing |
| B | SYNP | Syntax Parsing |
| C | CTX | Context determination |
| D | VLD | Viable Length Decoding |
| E | RLD | Run Length Decoding |
| F | MBG | MB Generator |
| G | DCR | DC Reconstructor |
| H | DCR4X4 | DC Reconstructor for 4X4 block |
| I | IS | Inverse Scan |
| J | IAP | Inverse AC Prediction |
| K | IQ | Inverse Quantization |
| L | IQ4X4 | Inverse Quantization for 4X4 block |
| M | IT | Inverse Transform |
| N | IT4X4 | Inverse Transform for 4X4 block |
| O | FFR | Frame Field Recordering |
| P | VR | VOP Reconstructor |
| Q | IPR | Intra prediction and Picture Reconstruction |
| R | DF | DE-blocking Filter |

FIG. 16

| mcbpc[1-9] | AC Prediction flag [1] | cbpy[1-6] | dquant[2] | DCT type [1] | #1 block | ... | #6 block |

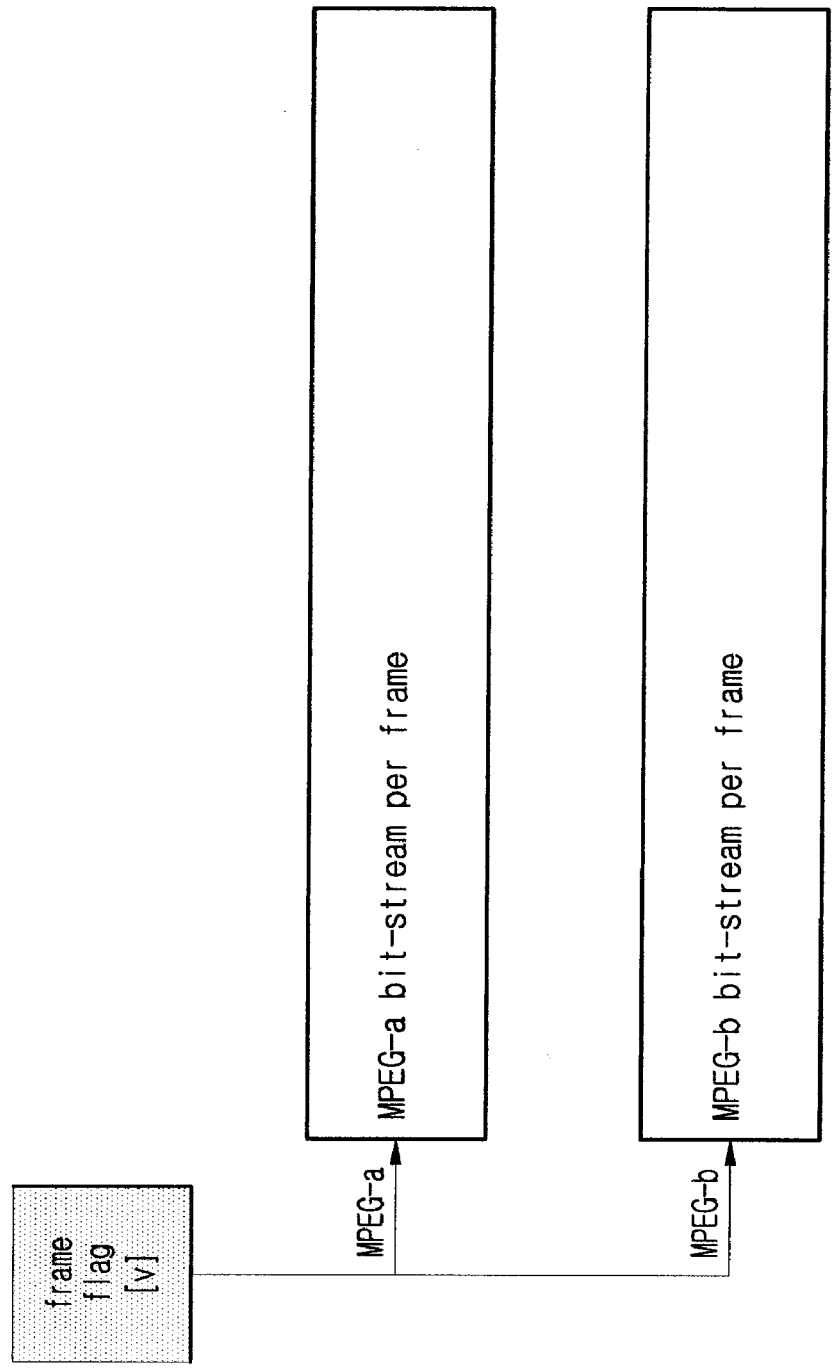

DEVICE AND METHOD FOR MERGING CODECS

TECHNICAL FIELD

The present invention is directed to unified codecs, more specifically to a unified codec device that can be universally used for various encoding/decoding standards and a method thereof.

BACKGROUND ART

In general, video codecs are similarly structured, but the detailed process for each structure can be different from one another. It is imperative that this difference be considered when creating a unified codec.

FIG. 1 shows a typical process of a unified codec based on the related art. FIG. 1 illustrates the operational principle of a typical intra-only unified codec, focused on MPEG-2, MPEG-4 and AVC Intra coding.

Referring to FIG. 1, the process consists of, in the sequential and functional order, parsing and entropy decoding S100, data-reordering S110, inverse scan S120, inverse DC/AC prediction S130, inverse quantization S140, inverse transform S150, inverse intra-prediction S160, memory for decoded samples S170 and deblocking-filter S180.

As described above, the unified codec of the related art is simply divided by the function or the order of process, and each step is structured to process in detail according to the codec. Since functional units are pre-assigned to each codec, the user has only been allowed to use the functional units provided by the codec corresponding to the pertinent standard once the user selected a standard.

Although the unified codec of the related art unified a number of video codecs, one fixed codec had to be used to encode/decode one video.

DISCLOSURE

Technical Problem

Contrived to solve the above problems, the present invention provides a unified codec device and a method thereof that can be universally used for a variety of encoding/decoding standards by providing a new concept and structure of unified codec corresponding to similarities, differences and considerations between different video codecs.

The present invention also provides a unified codec device and a method thereof that can use the functional unit (FU) recombination technology to freely decode bit streams encoded by various standards.

This invention also provides a unified codec device and a method thereof that can unify different video codecs without any functional change in a block-based video codec.

The present invention also provides a unified codec device and a method thereof that allow individually independent functional units to organically function.

The present invention also provides a unified codec structure that can be used for unifying block-based video and picture codecs other than MPEG-2, MPEG-4 and MPEG-4 AVC.

The present invention also provides an international standard on the concept and structure of unifying video codecs. Other objectives of the present invention will be apparent through the embodiments described below.

Technical Solution

In order to achieve the above object, an aspect of the present invention features a unified codec device having an encoder and a decoder that can be universally used regardless of the standard.

According to an embodiment of the present invention, the unified codec device comprises a decoding control unit, which sets a connection relation of functional units by interpreting connection information from an inputted universal bitstream or data, and a functional group, which consists of a plurality of functional units and in which at least one functional unit is sequentially activated in accordance with a connection control of the decoding control unit to process a bitstream included in the universal bitstream.

The decoding control unit can receive a control parameter from a functional unit and provide the control parameter to a corresponding functional unit for processing the bitstream.

The functional group can comprise a parsing and decoding (PD) functional group, which extracts a control parameter in the bitstream in accordance with an operation control based on the connection relation of the decoding control unit and outputs data in units of macroblocks by processing the bitstream, and a macroblock-based (MB) functional group, which outputs image data by processing the inputted macroblock-unit data in accordance with an operation control based on the connection relation of the decoding control unit and a control parameter provided by the decoding control unit. Each of the PD functional group and the MB functional group consists of a plurality of functional units.

The PD functional group can further extract a connection control display value included in the bitstream and provide the connection control display value to the decoding control unit, and the decoding control unit can use the control connection display value to control the operation of at least one functional unit included in at least one of the PD functional group and MB functional group.

The decoding control unit can comprise a connection control unit, which sets the connection relation by interpreting the connection information and controlling the sequential start of the operation of a functional unit included in the PD functional group and the MB functional group, and a process control unit, which receives from the PD functional group and MB functional group a control parameter included in a header of the bitstream or generated through processing the bitstream and delivers a corresponding control parameter to a corresponding functional unit.

The connection information can comprise at least one from the group consisting of a branch condition and information on connection of the functional units, and the functional units can be connected in at least one of the serial and parallel relations in accordance with the connection information.

The decoding control unit can determine whether the connection control display value extracted from the bitstream and provided by a predetermined functional unit satisfies the branch condition, and can select one functional unit to process the bitstream among a plurality of functional units having a parallel relation.

The control parameter can comprise a control signal (CS) and context information (CI), whereas the control signal can instruct whether the function of a functional unit included in the MB functional group is to be executed, and the context information can be supplementary information needed when executing the function of the functional unit.

The control signal can comprise at least one selected from the group consisting of an AC prediction flag, a coded block pattern, a quantization scale value, a data partition flag, an image size and a short video header flag.

In case the execution of a function is instructed in accordance with the control information, the context information can comprise information needed for the execution of the function.

The decoding control unit can process the control parameter to correspond and can deliver the control parameter to each functional unit included in the MP functional group.

In order to achieve the above objects, another aspect of the present invention features a method of unifying codecs that can be used universally regardless of the standard.

According to an embodiment of the present invention, the method of unifying codecs comprises the acts of (a) a decoding control unit interpreting connection information from an inputted universal bitstream or from independent data and setting a connection relation of each functional unit; (b) the decoding control unit instructing a functional unit to process a bitstream or data in accordance with a process order of each functional unit, the process order being determined by the connection relation, the bitstream being included in the universal bitstream or being independently received, the data corresponding to the bitstream; and (c) the instructed functional unit processing the bitstream or the data in accordance with a predetermined process method. The steps (b)-(c) can be repeated until the bitstream is restored as image data.

The decoding control unit, in the step (b) or prior to the step (b), can determine whether a connection control display value provided by a functional unit that processed the bitstream or the data satisfies a branch condition included in the connection information and can select one from a plurality of functional units having a parallel relation.

The step (b) can further comprise the step of providing a control parameter for processing the bitstream or the data to a functional unit that is instructed to process, and in the step (c), the instructed functional unit can process the bitstream or the data in a predetermined process method, using the control parameter.

The control parameter can comprise a control signal and context information, whereas the control signal can instruct whether a functional unit is to be executed, and the context information can be supplementary information needed for executing a function of the functional unit.

The decoding control unit can process the control parameter in a predetermined method and deliver the processed control parameter to a corresponding functional unit.

DESCRIPTION OF DRAWINGS

FIG. 6 shows an example of a universal FU table in accordance with an embodiment of the present invention;

FIGS. 12, 14, 16 and 18 show the bit stream syntax in accordance with an embodiment of the present invention.

MODE FOR INVENTION

Figure 1:
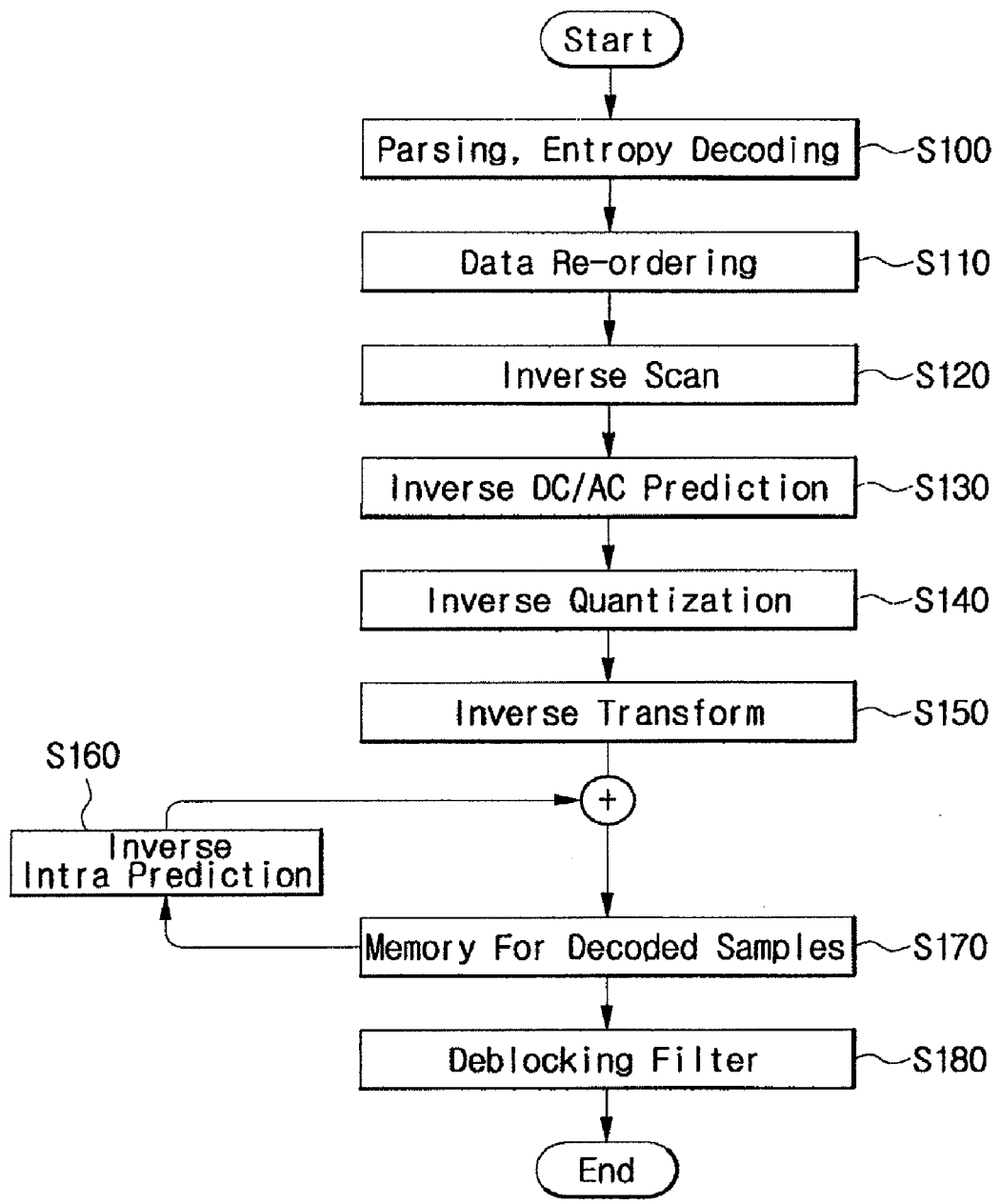
FIG. 1 shows the method for processing a unified codec according to the related art.

The present invention, operative advantages of the present invention and objectives achieved by embodying the present invention shall be apparent with reference to the accompanying drawings and the description therein.

Hereinafter, preferred embodiments of the present invention shall be described in detail with reference to the accompanying drawings. To aid overall understanding of the present invention, identical reference numerals will be assigned to the same means, regardless of the figure number.

Figure 2:
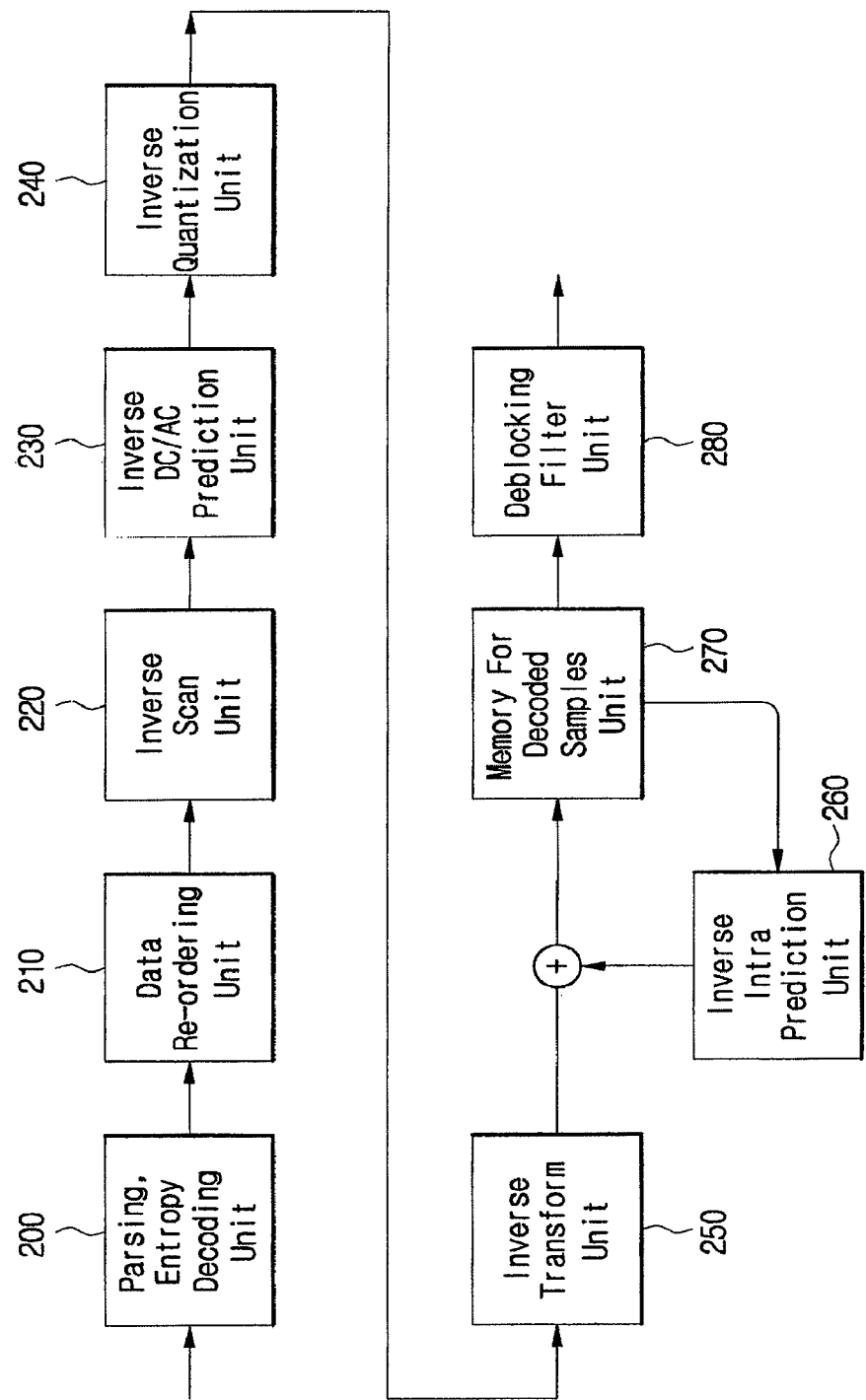
FIG. 2 shows the structure of a unified codec according to the related art.
Figure 3:
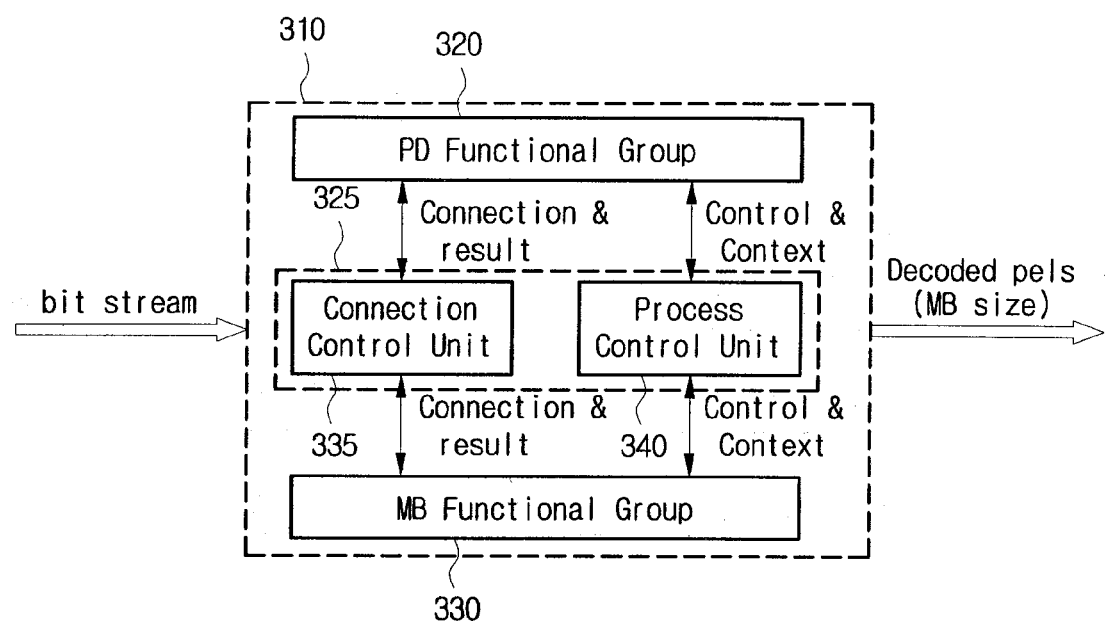
FIG. 3 shows the structure of a unified codec based on an embodiment of the present invention.
Figure 4:
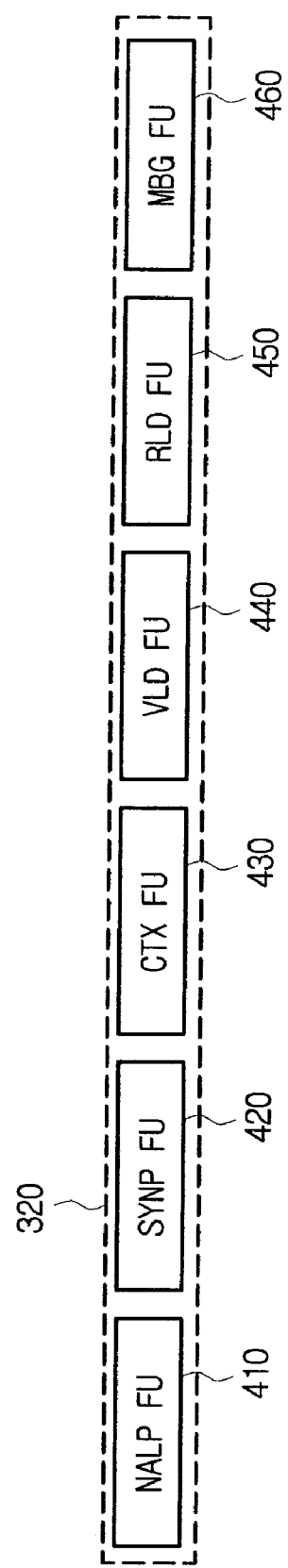
FIG. 4 shows how PD functional units are organized in accordance with an embodiment of the present invention.
Figure 5:
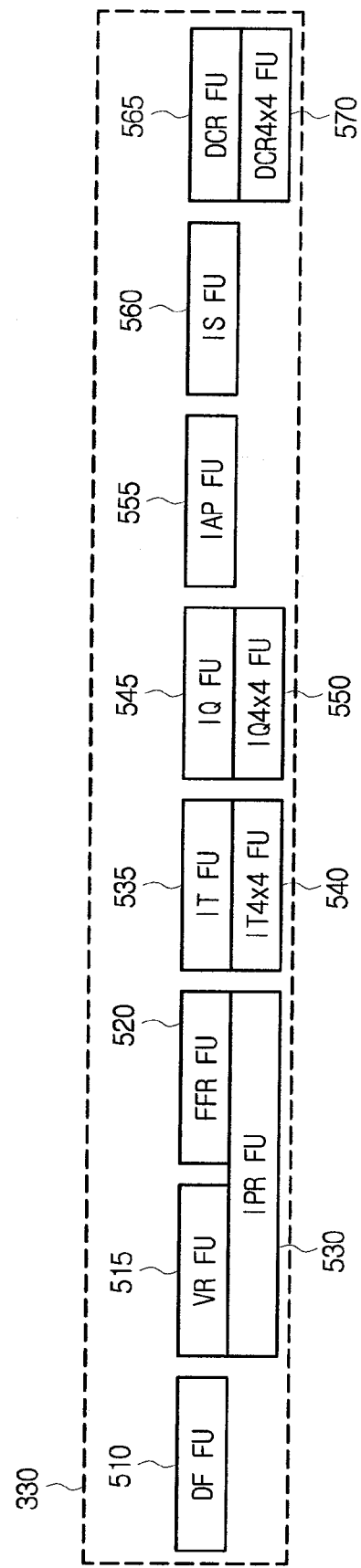
FIG. 5 shows how MB functional units are organized in accordance with an embodiment of the present invention.
Figure 7:
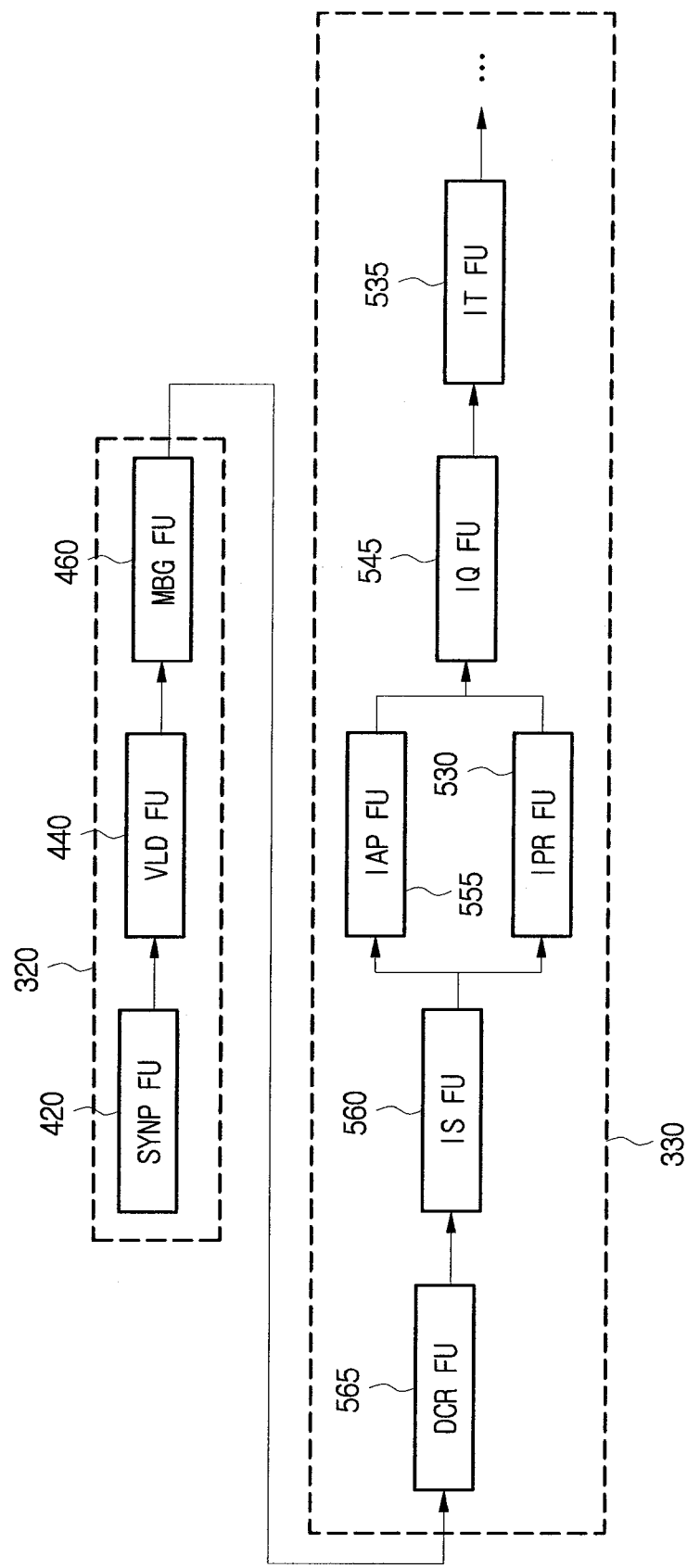
FIG. 7 shows how the FUs that are translated by connection information are connected in accordance with an embodiment of the present invention.

FIG. 2 shows the structure of a unified codec according to the related art; FIG. 3 shows the structure of a unified codec based on an embodiment of the present invention; FIG. 4 shows how PD functional units are organized in accordance with an embodiment of the present invention; FIG. 5 shows how MB functional units are organized in accordance with an embodiment of the present invention; FIG. 6 shows an example of a universal FU table in accordance with an embodiment of the present invention; and FIG. 7 shows how the FUs that are translated by connection information are connected in accordance with an embodiment of the present invention.

Referring to FIG. 2 showing the structure of a conventional unified codec, a unified codec device consists of a parsing and entropy decoding unit 200, a data-reordering unit 210, an inverse scan unit 220, an inverse DC/AC prediction unit 230, an inverse quantization unit 240, an inverse transform unit 250, an inverse intra-prediction unit 260, a memory for decoded samples unit 270 and a deblocking filter unit 280.

As shown in FIG. 3, on the other hand, a decoding unit 310 of a unified codec device, in accordance with the present invention, comprises PD functional group 320, a decoding control unit 325 and MB functional group 330. Each functional group and control unit can be realized in a collection of source codes. The PD functional group 320 and the MB functional group 330 comprise a plurality of functional units, which are independently realized but can continuously operate by the control of the decoding control unit 325. The PD functional group 320 and the MB functional group 330 can be combined in one functional group.

Each of the functional units included in the PD functional group 320 and the MB functional group 330, respectively, can be subdivided into a processing unit, which processes inputted data and then outputs the processed data, and a context-control unit, which controls the processing unit by receiving control parameters (i.e. context information and control signals) from a process control unit 340 and provides the resulted or extracted control parameters to the process control unit 340. For example, a control context processing unit can control the data process of the processing unit by receiving coding parameters and mode selection signals as control parameters from the process control unit 340 and then deliver the resulted or extracted parameters to the process control unit 340.

The process control unit 340 provides a control parameter, received from an FU that is operated earlier, to an FU that is operated later and needs the control parameter.

The PD functional group 320 performs the parsing and decoding function. That is, the PD functional group 320 extracts and classifies context information, a control signal, a connection control display value and data from the inputted universal bitstream in accordance with different grammar per codec. The universal bitstream can consist of a header and a typical bitstream. The header can comprise connection information and rule description. The rule description describes the class structure between syntax elements. It is evident that the connection information and rule description are not included in the universal bitstream and can be delivered as independent data to decoding unit. Since the Korean patent KR10-2005-0066015 discloses how to process and use the rule description, detailed description about the process and use of the rule description will be omitted here. It shall be evident, however, to those of ordinary skill in the art that the technical spirit of KR10-2005-0066015 can be used identically or similarly in the present invention.

The PD functional group 320 can comprise, as shown in FIG. 4, an NALP (Network Abstraction Layer Parsing) FU 410, an SYNP (Syntax Parsing) FU 420, a CTX (Context Determination) FU 430, a VLD (Variable Length Decoding) FU 440, an RLD (Run Length Decoding) FU 450 and an MBG (Macro Block Generator) FU 460. It is evident that the PD functional group 320 can not only comprise any functional unit for performing the parsing and decoding function, regardless of the applied standard, but also additionally include a functional unit needed with technological development, modify the existing functional unit and remove an unnecessary functional unit. It is also evident that each functional unit disposed in the PD functional group 320 is not independently present in each standard, and functional units that can handle the same process regardless of the standard can be combined to a single functional unit. Since the function of each functional unit is familiar to those of ordinary skill in the art, the pertinent description will be provided briefly below.

The NALP FU 410 parses a network abstraction layer (NAL) of MPEG-4 AVC, and the SYNP FU 420 parses the syntax of a bitstream. The SYNP FU 420 can be included in the VLD FU 440.

The CTX FU 430 determines a VLC table of MPEG-4 AVC, and the VLD FU 440 performs the entropy decoding. The VLD FU 440 extracts a connection control display value (inserted by the encoder) corresponding to the branch condition and sends the value to the connection control unit 335, enabling the connection control unit 335 to select an FU to process the pertinent data in the MB functional group 330. Depending on the way the decoder is designed, it is possible to predesignate the connection control display value to be extracted by the SYNP FU 420.

The RLD FU 450 performs entropy-decoding of AC values, and the MBG FU 460 combines the DC values and AC valued to generate MB (macroblock) data. The functions of all of the functional units or some functional units of the above PD functional group can be included in the VLD FU 440.

The MB functional group 330 decodes the data outputted from the PD functional group 320 to output video data of a predetermined macroblock size.

As shown in FIG. 5, the MB functional group 330 comprises a DF (De-blocking Filter) FU 510, A VR (VOP Reconstructor) FU 515, an FFR (Frame Field Reordering) FU 520, an IPR (Intra prediction and Picture Reconstruction) FU 530, an IT (Inverse Transform) FU 535, an IQ (Inverse Quantization) FU 545, an IAP (Inverse AC Prediction) FU 555, an IS (Inverse Scan) FU 560 and a DCR (DC Reconstruction) FU 565. The block size processed by an IT4×4 FU 540, an IQ4×4 FU 550 and a DCR4×4 FU 570 is 4×4. This is because MPEG-4 AVC processes data in units of 4×4 blocks, while MPEG-1/2/4 processes data in units of 8×8 blocks during the transform, quantization and prediction. It is evident that the MB functional-group 330 can not only comprise any functional unit for performing data decoding, regardless of the applied standard, but also additionally include a functional unit needed with technological development, modify the existing functional unit and remove an unnecessary functional unit. For example, functional units, such as an IS4×4, processing the data in units of 4×4 blocks for decoding, can be added to the MB functional group 330 if such functional units are needed.

It is evident that each functional unit disposed in the MB functional group 330 is not independently present in each standard, and functional units that can handle the same process regardless of the standard can be combined to a single functional unit. Since the function of each functional unit is familiar to those of ordinary skill in the art, the pertinent description will be provided briefly below.

The DF FU 510 is a de-blocking filter of MPEG-4 AVC, and the VR FU 515 stores a recovered pixel value.

The FFR FU 520 is for an interlaced mode, and the IPR FU 530 stores a recovered pixel value after performing intra-prediction of MPEG-4 AVC.

The IT FU 535 inverse-transforms DC values and AC values, and the IQ FU 545 inverse-quantizes AC values.

The IAP FU 555 inverse-predicts AC values, and the IS FU 560 inverse-scans AC values. The DCR FU 565 inverse-predicts and inverse-quantizes DC values.

The decoding control unit 325 comprises the connection control unit 335, which controls the operating orders of the functional units, and the process control unit 340, which controls the operation of each functional unit.

The connection control unit 335 controls the sequential operating steps of functional units whose connection relations in the PD functional group 320 and MB functional group 330 are not fixed but variable.

To set the connection relation of the functional units, the connection control unit 335 uses the connection information provided by the encoder (not shown).

The connection information comprises information on connectivity and branch, and can be received by being inserted in the header of the universal bitstream or received in an independent data form. In case the connection information is received by being inserted in the header of the universal bitstream, the connection control unit 335 reads and interprets the information. Of course, the connection information can be read from the header of the universal bitstream by another independent element.

The connection information is generated, during the encoding, to correspond to the functional units selected by the user (for example, generated as a decoding route corresponding to an encoding route) and inserted in the header of the universal bitstream, or it is generated as independent data (or an electronic file) and delivered to the decoder 310. The connection information can be generated by an element in the encoder.

The connection information can be structured, for example, in the following format:

connection=connectivity (B, D), (D, F), (F, G), (G, I), (I, J), (I, Q), (J, K), (Q, K), (K, M), . . . , branch prediction_flag=='AC/DC', case1(J), case2(Q)

In the above example, the first row is the information on the connectivity while the second row is the information on the branch. There can be a variety of serial/parallel connection structures of the functional units, based on the information on connectivity and branch.

The connection control unit 335 uses a pre-stored universal FU table (refer to FIG. 6) and the information on connectivity and branch to interpret the connection relation of functional units included in the PD functional group 320 and MB functional group 330, and then instructs a functional unit, following the data process by a particular functional unit, to process data.

By determining whether the branch condition included in the connection information is satisfied, using the connection control display value inputted from the PD functional group 320, the connection control unit 335 can select one of the plurality of functional units defined to have a parallel relation in the connection information. As described earlier, the connection control display value can be included in the header of the bitstream.

The connection relation of functional units, set by interpreting the connection information received or extracted by the connection control unit 335, is illustrated in FIG. 7. The connection control unit 335 specifies each FU by using the index included in the connection information and the universal FU table (refer to FIG. 6). For example, the index B can be specified as the SYNP FU 420.

As described above, the connection control unit 335 can decide which PU is to follow the operation, using the connection control display value (i.e. condition information on branch, for example, prediction_flag='AC/DC'). The connection control display value for determining the satisfaction status of the branch condition can be extracted in the bitstream (refer to FIGS. 12, 14, 16 and 18). The connection control display value corresponding to the branch condition is extracted and/or generated by the VLD FU 440 and is sent to the connection control unit 335, which instructs the corresponding FU to process the pertinent data, according to the satisfaction status of the branch condition.

The process control unit 340 provides a control parameter (i.e. context information) and a control signal for processing bitstream (or data) to a particular FU instructed by the connection control unit 335 to operate, and receives from the particular FU a control parameter generated or extracted by processing the bitstream (or data). The process control unit 340 can recognize which FU will provide the control parameter, by linking with the connection control unit 335.

To perform the process operation, each FU needs a control parameter for controlling the pertinent process operation. For example, the IS FU 560 needs a quantization parameter for performing quantization, in addition to the data to process (i.e. MB data). This parameter can be referred to as a control signal. As such, if the control signal is a critical parameter (e.g. an AC prediction flag, a coded block pattern, a quantization scale value, a data partition flag, an image size and a short video header flag) for the process operation of the particular FU, the context information can be considered as a supplementary parameter. For example, when the IAP FU 555 performs a process operation, ac_prediction_flag for AC prediction can be considered as the control signal, and ac_prediction_direction, which is supplementary information for performing the actual AC prediction, can be considered as the context information. It shall be evident, however, to those of ordinary skill in the art that the control signal and the context information do not have to be used separately and can be combined.

Figure 8:
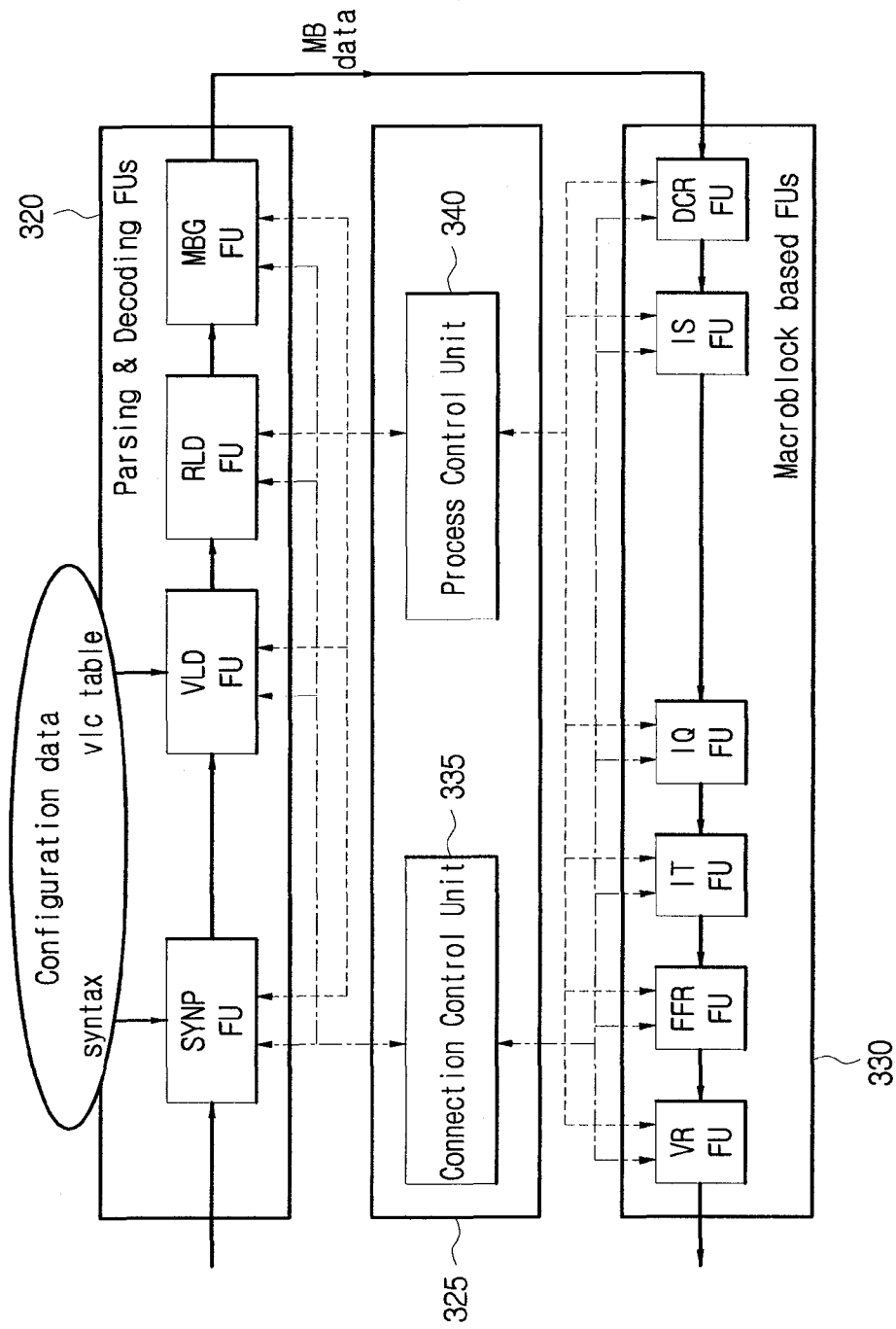
FIG. 8 shows how the FUs that can be used in MPEG-1/2 are connected in accordance with an embodiment of the present invention.
Figure 9:
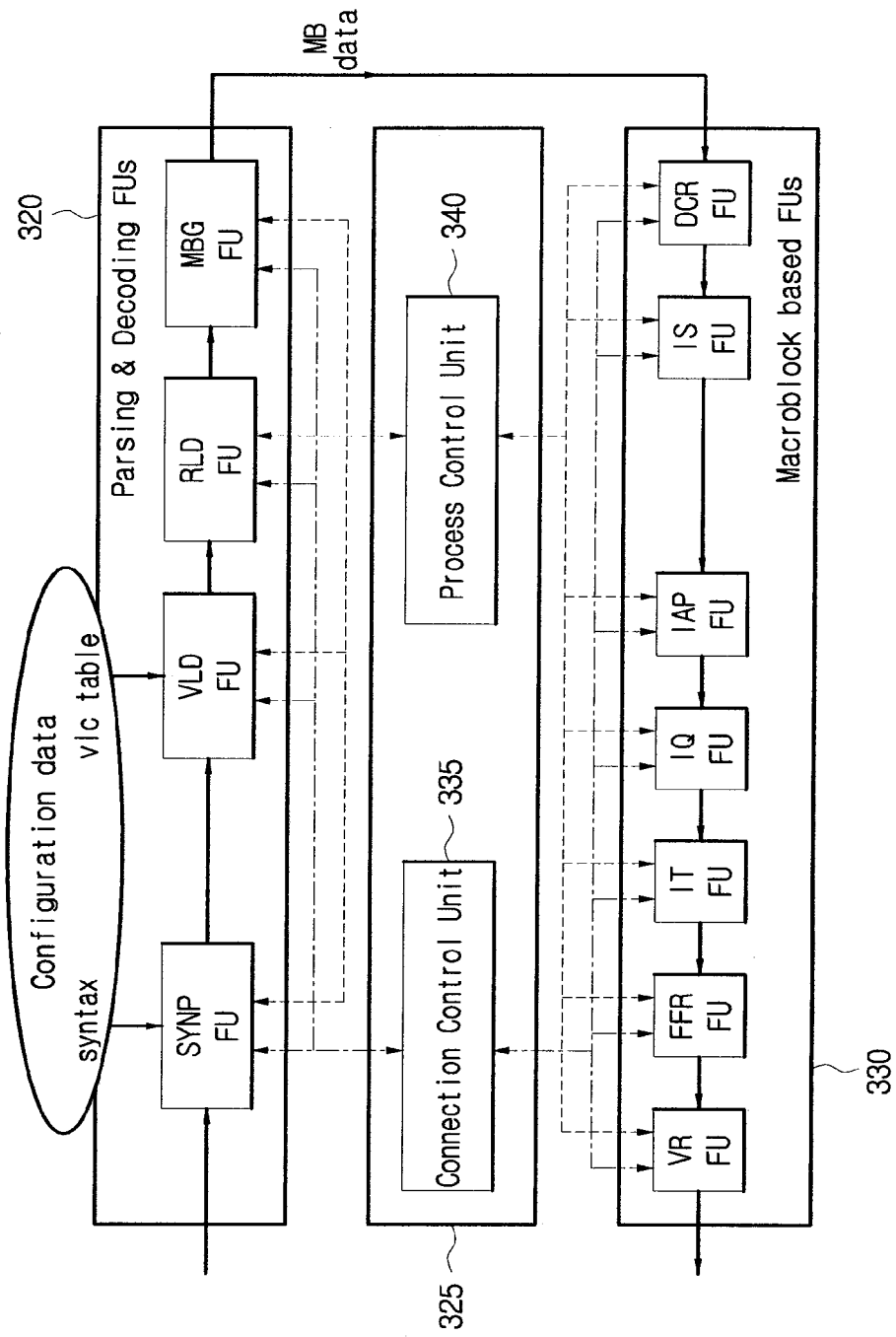
FIG. 9 shows how the FUs that can be used in MPEG-4 are connected in accordance with an embodiment of the present invention.
Figure 10:
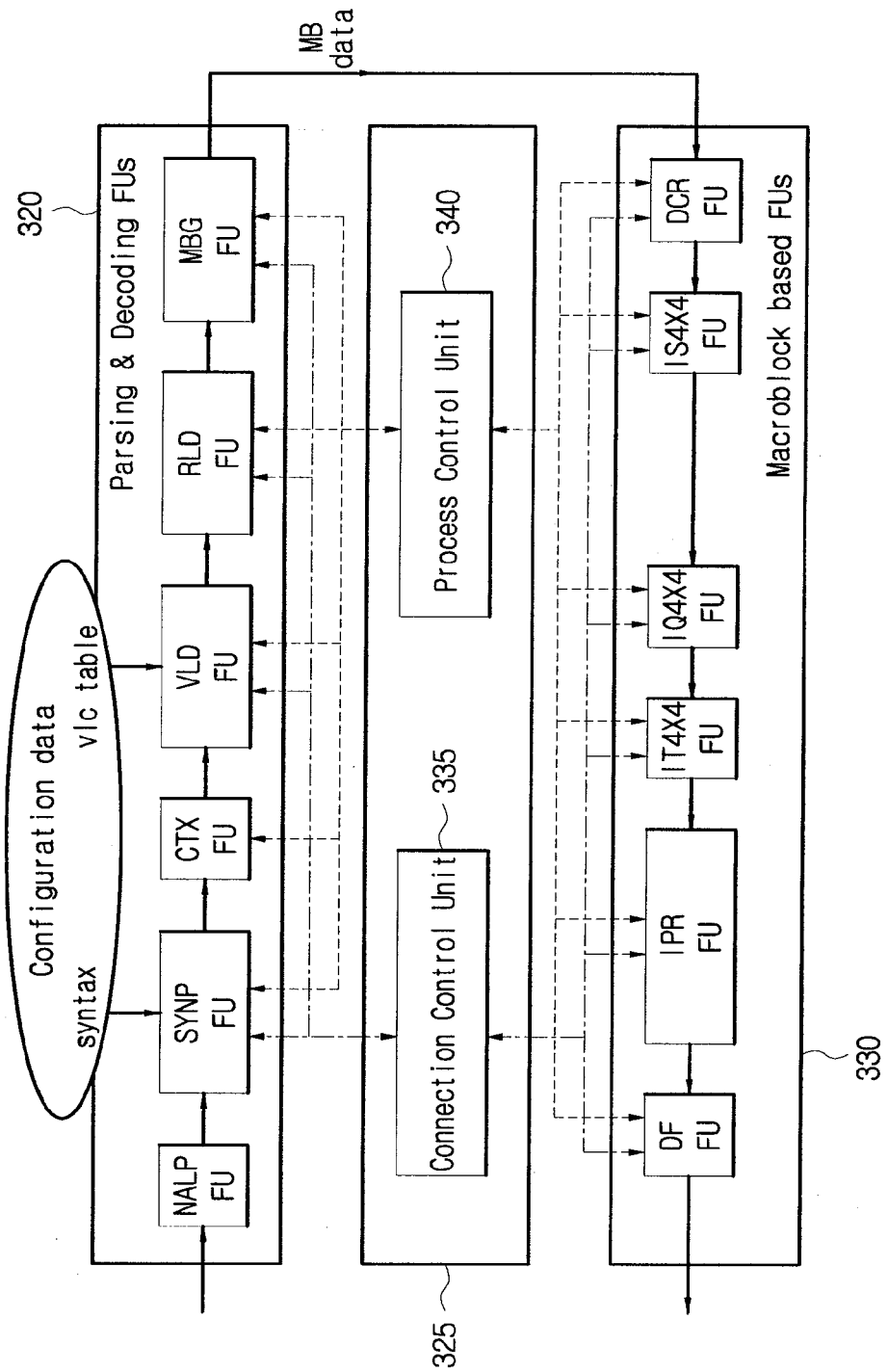
FIG. 10 shows how the FUs that can be used in MPEG-4 AVC are connected in accordance with an embodiment of the present invention.

FIG. 8 shows how the FUs that can be used in MPEG-1/2 are connected in accordance with an embodiment of the present invention; FIG. 9 shows how the FUs that can be used in MPEG-4 are connected in accordance with an embodiment of the present invention; and FIG. 10 shows how the FUs that can be used in MPEG-4 AVC are connected in accordance with an embodiment of the present invention.

The following is a brief description of functional units used per each encoding/decoding standard.

As shown in FIG. 8, MPEG-1 and MPEG-2 MP (main profile) do not have the inverse AC prediction function and support the interlaced mode.

By contrast, as shown in FIG. 9, MPEG-4 SP/ASP (simple profile/advanced SP) has the inverse AC prediction function in comparison with MPEG-1/2, and although the interlaced mode is not supported in the SP, the interlaced mode is supported in the ASP.

Moreover, as shown in FIG. 10, MPEG-4 AVC BP (baseline profile), which is quite different from MPEG-1/2/4, uses the NALP FU 410, which processes NAL of AVC, the CTX FU 430, which determines the VLC table, and intra prediction instead of inverse AC/DC prediction, and further uses the IPR FU 530, which performs the above intra prediction together with the VOP reconstruction, and DF FU 510, which de-blocks. It is also different from MPEG-1/2/4 in that the size of IS (inverse scan), IQ (inverse quantization) and IT (inverse transform) is 4×4.

In conventional codec devices, the connection relation of functional units was pre-fixed such that the functional units were appropriate for each standard.

By contrast, the codec device in accordance with the present invention can be universally used regardless of the encoding standard of the bitstream, since the connection control unit 335 is included in the header of the universal bitstream or determines the operating orders of each FU by interpreting the connection information, which is independent data. As described earlier, the connection information is inserted in the header of the universal bitstream or generated as independent data (or an electronic file) by being generated to correspond to the operation order of functional units used during the encoding.

Moreover, the process control unit 340, operating in link with the connection control unit 335, unifies the input and output of the control parameters for processing in each FU.

Furthermore, the connection control unit 335 is not restricted to instruct the sequential operation of each functional unit, as illustrated. For example, the connection control unit 334 can make the operations of the SYNP FU 420 and the VLD FU 440 alternate repeatedly. In addition, the connection control unit 335 can make the MB functional group 330 continuously process the continuous macroblock or make the PD FU 320 and MB functional group 330 operate repeatedly until the macroblock data for making up an image to display on the screen is completed processing prior to the operation of the VR FU 516 after the completion of the operation of the MB functional group 330 located before the VR FU 515. This can vary according to the size of data to be decoded that the PD functional group 320 store in the memory or other storage device. Since it is evident to those of ordinary skill in the art that it may be necessary to alternately run each functional unit, its relevant detailed description will not be provided here. Each functional unit will process the data by use of control parameters provided by the process control unit 340.

FIGS. 11, 13, 15 and 17 show the connection structures of the FUs in accordance with various embodiments of the present invention; and FIGS. 12, 14, 16 and 18 show the bit stream syntax in accordance with an embodiment of the present invention.

The connection control unit 335 of the present invention can be inserted in the header of the universal bitstream, or can generate a decoder consisting of a plurality of functional units, using the connection information received as independent data. Likewise, by having the connection relation of functional units selected by the user in the encoder for generating the bitstream, a variety of encoders can be generated. Since the method for generating an encoder can be easily understood by the method for generating a decoder that is described in detail herein, the pertinent description will not be provided herein. However, unlike the decoder, the encoder can further comprise an element generating connection information.

Each encoder/decoder, consisting of a plurality of functional units, can be realized in a variety of encoders or decoders, depending on the method of setting the operational orders or connection structure between the functional units. It is possible to make a serial, parallel or serial/parallel connection of functional units, and the connection structure can be realized in a variety of forms depending on the method of designing the encoder/decoder.

Now, various forms of encoders/decoders will be described with reference to the related drawings.

Figure 11:
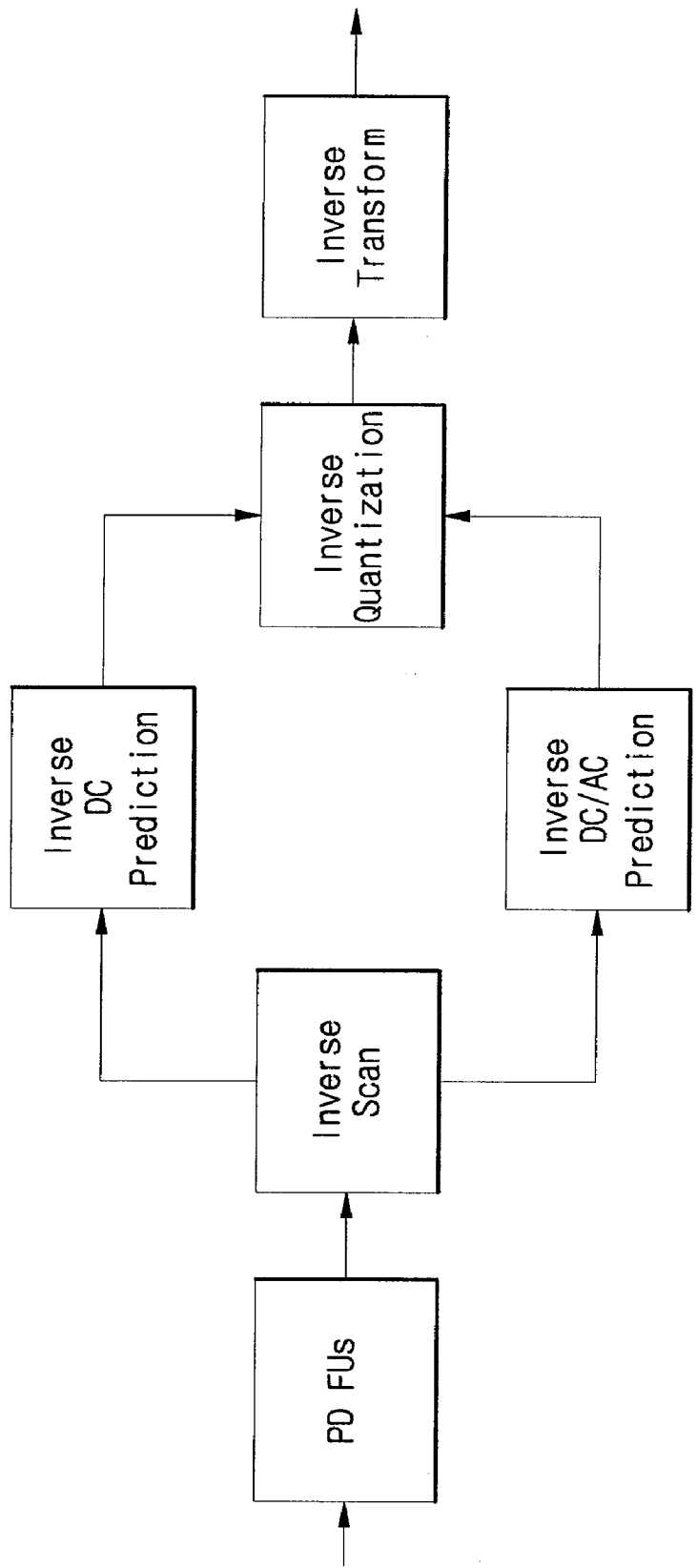
FIGS. 11, 13, 15 and 17 show the connection structures of the FUs in accordance with various embodiments of the present invention.
Figure 12:
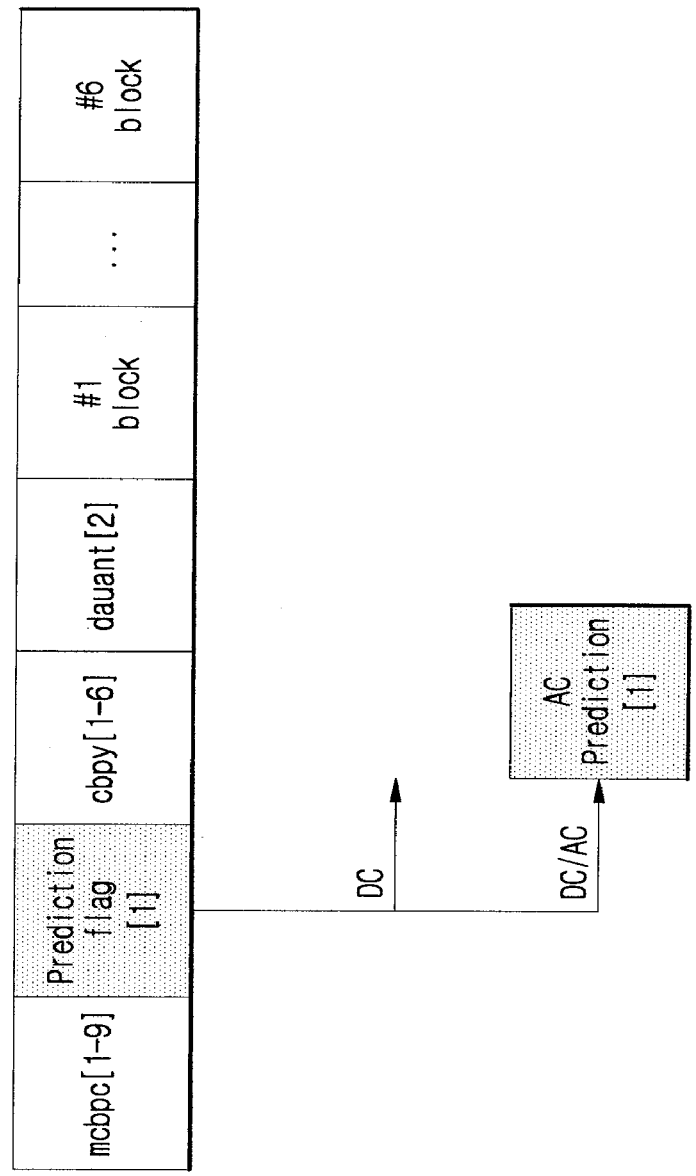

FIG. 11 is an example of a decoder that supports both the inverse DC prediction and the inverse AC/DC prediction.

Once the universal bitstream is received, the connection control unit 335 extracts the connection information from the header and interprets it. As described earlier, the connection information can be received as separate, independent data.

In order for the functional units to be connected as shown in FIG. 11, the following can be composed, according to the universal FU table shown in FIG. 6:

connection=connectivity . . . , (I, G), (G, K), (G, J), (J, K), (K, M), . . . , branch prediction_flag=='DC', case1(K), case2(J)

The inverse AC/DC prediction can be carried out by the sequential operation of the DCR FU 565 and the IAP FU 555.

After interpreting the connection relation of the functional units, using the connection information, as shown in FIG. 11, the connection control unit 335 instructs the function of each FU until the branch point is reached. That is, after instructing the IS FU 560 to start processing data, the connection control unit 335 instructs the DCR FU 565 to start processing data, once the process completion information is inputted from the IS FU 560.

The process control unit 340 links with the connection control unit 335 to provide a functional unit, which is to start processing the current data, a control parameter needed for processing data, and receives from the functional unit a control parameter that is extracted or generated during the process of processing data.

At the branch point, the connection control unit 335 determines whether the branch condition is satisfied, using a connection control display value (refer to FIG. 12) delivered from the VLD FU 440. In case the branch condition is satisfied (i.e. prediction_flag=='DC'), the IQ FU 545 instructs the start of data processing, and if the branch condition is not satisfied, the IAP FU 555 instructs the start of data processing.

Through the above steps, the inputted bitstream will be transformed to video data and displayed on the display unit (not shown).

However, the bitstream or data processing in not necessarily processed in the order of the connection structure shown in FIG. 11, and it is possible that a plurality of functional units alternate repeatedly to process data by the structure of the connection information and/or the control of the process control unit 340.

Figure 13:
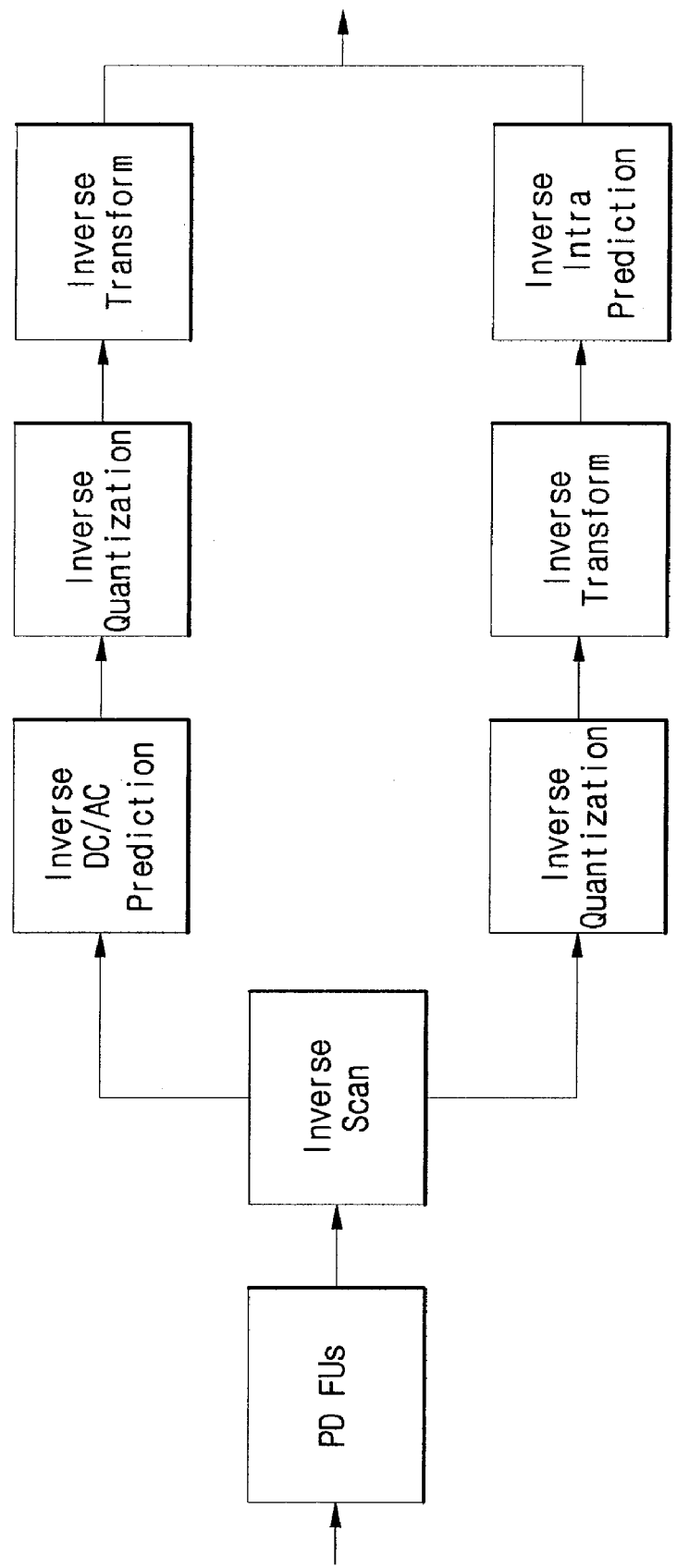
Figure 14:
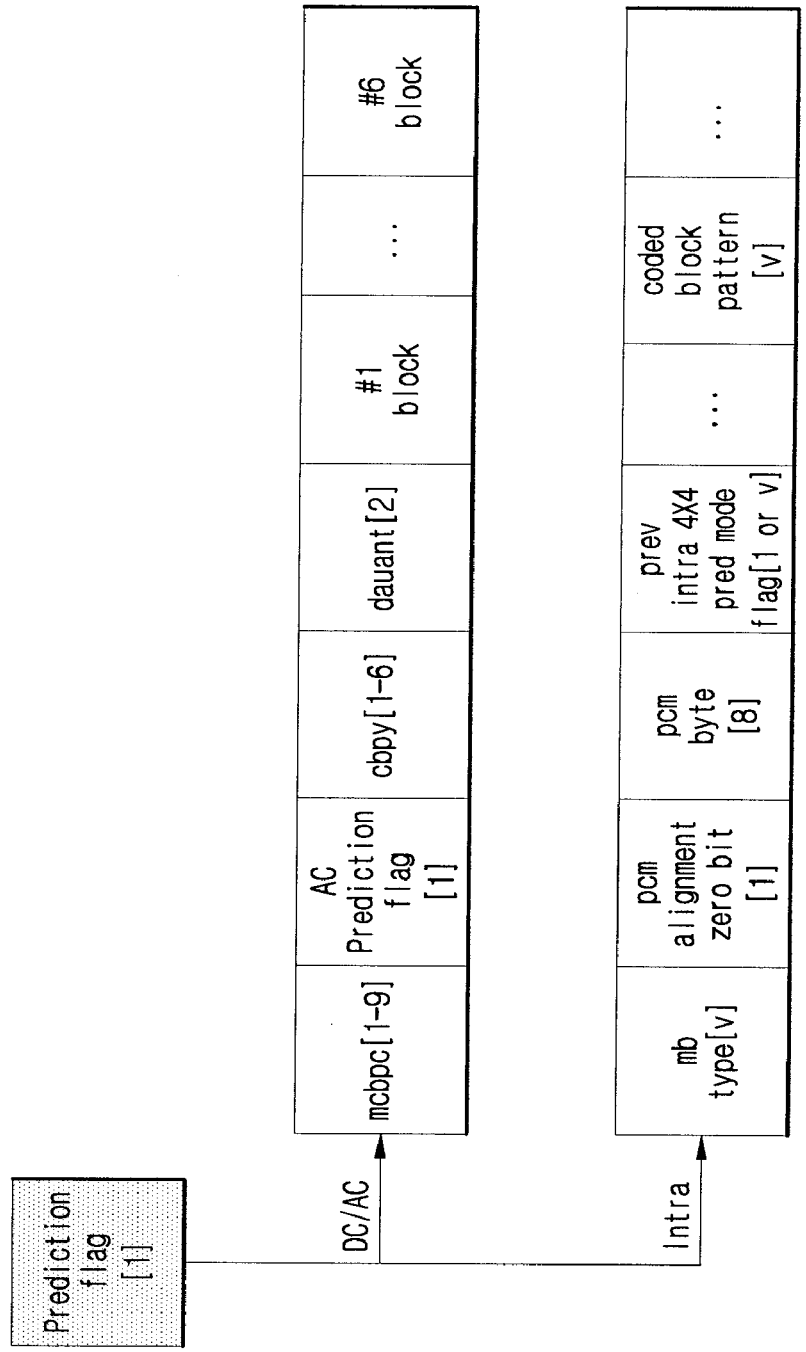

FIG. 13 is an example of a decoder that supports both the inverse AC/DC prediction and the inverse intra prediction.

In other words, one decoding route processes the inverse AC/DC prediction, inverse quantization and inverse transform, and the other route processes the inverse quantization, inverse transform and inverse intra prediction.

Once the universal bitstream is received, the connection control unit 335 extracts the connection information from the header and interprets it. As described earlier, the connection information can be received as separate, independent data.

In order for the functional units to be connected as shown in FIG. 13, the following can be composed, according to the universal FU table shown in FIG. 6:

connection=connectivity . . . , (I, G), (G, J), (J, K), (K, M), (I, K), (K, M), (M, Q), . . . , branch prediction_flag=='AC/DC', case1(G), case2(K)

The inverse AC/DC prediction can be carried out by the sequential operation of the DCR FU 565 and the IAP FU 555.

After interpreting the connection relation of the functional units, using the connection information, as shown in FIG. 13, the connection control unit 335 instructs the function of each FU until the branch point is reached.

The process control unit 340 links with the connection control unit 335 to provide a functional unit, which is to start processing the current data, a control parameter needed for processing data, and receives from the functional unit a control parameter that is extracted or generated during the process of processing data.

At the branch point, the connection control unit 335 determines whether the branch condition is satisfied, using a connection control display value (refer to FIG. 14) delivered from the VLD FU 440. In case the branch condition is satisfied, the DCR FU 565 instructs the start of data processing, and if the branch condition is not satisfied, the IQ FU 545 instructs the start of data processing.

Through the above steps, the inputted bitstream will be transformed to video data and displayed on the display unit (not shown).

However, the bitstream or data processing in not necessarily processed in the order of the connection structure shown in FIG. 13, and it is possible that a plurality of functional units alternate repeatedly to process data by the structure of the connection information and/or the control of the process control unit 340.

Figure 15:
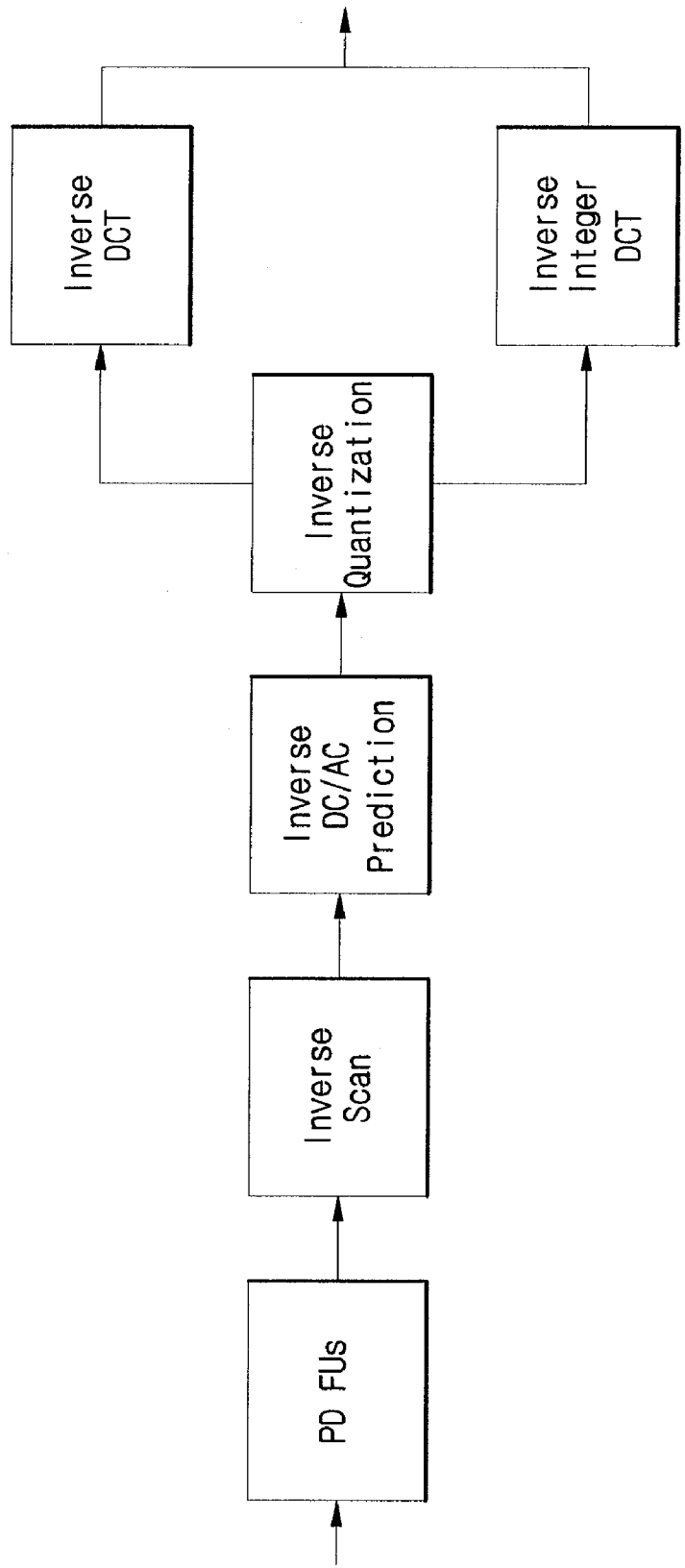
Figure 17:
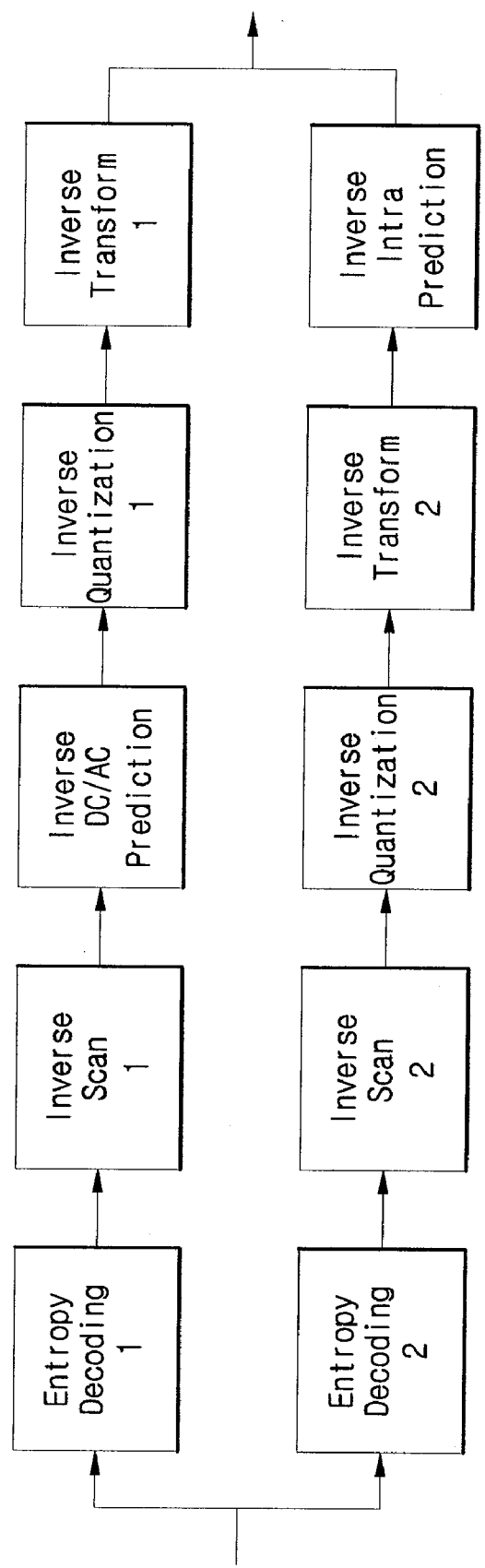

FIG. 15 is an example of a decoder that supports both the inverse DCT and the inverse integer DCT.

Once the universal bitstream is received, the connection control unit 335 extracts the connection information from the header and interprets it. As described earlier, the connection information can be received as separate, independent data.

In order for the functional units to be connected as shown in FIG. 15, the following can be composed, according to the universal FU table shown in FIG. 6:

connection=connectivity . . . , (I, G), (G, J), (J, K), (K, S), (K, T), . . . , branch prediction_flag=='float', case1(S), case2(T)

The inverse AC/DC prediction can be carried out by the sequential operation of the DCR FU 565 and the IAP FU 555. The universal FU table, shown in FIG. 6, does not have a FU carrying out the inverse DCT function (for example, the index of "S") and a FU carrying out the inverse IDCT function (for example, the index of "T"). As such, the functional unit needed for decoding can be inserted through the update steps of the functional units.

After interpreting the connection relation of the functional units, using the connection information, as shown in FIG. 15, the connection control unit 335 instructs the function of each FU until the branch point is reached.

The process control unit 340 links with the connection control unit 335 to provide a functional unit, which is to start processing the current data, a control parameter needed for processing data, and receives from the functional unit a control parameter that is extracted or generated during the process of processing data.

At the branch point, the connection control unit 335 determines whether the branch condition is satisfied, using a connection control display value (refer to DCT type [1] of FIG. 16) delivered from the VLD FU 440. In case the branch condition is satisfied, the FU processing the inverse DCT instructs the start of data processing, and if the branch condition is not satisfied, the FU processing the inverse IDCT instructs the start of data processing.

Through the above steps, the inputted bitstream will be transformed to video data and displayed on the display unit (not shown).

However, the bitstream or data processing in not necessarily processed in the order of the connection structure shown in FIG. 11, and it is possible that a plurality of functional units alternate repeatedly to process data by the structure of the connection information and/or the control of the process control unit 340.

FIG. 16 is an example of a decoder in which a series of functional units are connected parallel with one another to process decoding that is different from one another. That is, according to an embodiment of the present invention, by making the entire process route of the encoder/decoder a parallel structure, it can become possible to encode/decode the routines that are different according to the frame and/or image making up the bitstream.

For example, it is possible to realize a system in which the first image is encoded and decoded with MPEG-2, and the second image is encoded and decoded by MPEG-4. Moreover, it is possible to encode and decode the preceding plurality of frames with MPEG-4 and encode and decode the following plurality of frames with MPEG-4 AVC. As such, it is possible to have various encoding and decoding methods for one or more images and frames included in one bitstream.

Once the universal bitstream is received, the connection control unit 335 extracts the connection information from the header and interprets it. As described earlier, the connection information can be received as separate, independent data.

However, in order to process the decoding that is different according to the frame and/or image in predetermined units, the header of the universal bitstream must further comprise a connection control display value indicating the applied standard for instructing the decoding method to be applied (refer to FIG. 18). The connection control unit 335 determines which decoding route is to be used, using the connection control display value. As shown in FIG. 18, for example, the first through $10^{th}$ images can be encoded with MPEG-4; the $11^{th}$ through $15^{th}$ images can be encoded with MPEG-4 AVC; and the $16^{th}$ through $30^{th}$ images can be encoded with MPEG-2. It is possible, of course, to encode the first image with MPEG-2, the second image with MPEG-4 and the third image with MPEG-1.

The connection control display value, which indicates the applied standard, can be assigned for each image, and can be assigned for the entire frame or image in the header of the bitstream. The PD functional group 320 and/or the MB functional group 330 can process data for each frame, in which the connection control display value is assigned. Of course, as described earlier, the VR functional group 515 can stand by for data processing until the processing of the macroblock data for processing of one image is completed.

In the past, playing back a scene of, for example, a soccer game, which was broadcast using MPEG-2, through the DMB news using MPEG-4 AVC required the transcoding of the video, which was encoded with MPEG-2, with MPEG-4 AVC.

With the encoder and decoder in accordance with the present invention, however, the news can be broadcast by being encoded/decoded with MPEG-4 AVC while the soccer scene is broadcast using the original MPEG-2 bitstream. This is possible because, by encoding/decoding the frames in a parallel structure, the functional supplementary process operation corresponding to the route indicated by the connection control display value can be carried out.

Although the decoder has been described to describe the unified codec device and method in accordance with the present invention, the mutual relation between the encoder and decoder is well known to anyone skilled in the art to which the invention pertains, and it shall be evident that the present invention is not restricted to the decoder, considering that the encoder can be easily constructed through the detailed description of the decoder.

The accompanying drawings and detailed description are only examples of the present invention, serve only for describing the present invention, and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

INDUSTRIAL APPLICABILITY

As described above, the unified codec device and method of the present invention can be universally used in a variety of encoding/decoding standards by providing a new concept and structure of unified codec corresponding to similarities, differences and considerations between different video codecs.

The present invention can decode the bitstream that was encoded by various standards, using the functional unit recombination technology.

Furthermore, this invention enables the unification of different codecs without any change in the function of the block-based video codecs.

This invention can also allow the individually independent functional units to function organically.

Moreover, the present invention can be applied without any restrictions when unifying video or picture codecs processing in block units other than MPEG-1, MPEG-2, MPEG-4 and AVC.

The invention claimed is:

1. A unified codec device, comprising:
a decoding control unit configured to set a connection relation among a plurality of functional units by interpreting connection information obtained from input data; and
a functional group consisting of the plurality of functional units, at least two of the plurality of functional units configured to be sequentially activated, in accordance with a connection control received from the decoding control unit, to process the input data,
wherein the connection information consists of branch condition information and connection information related to serial and parallel connections between the plurality of functional units.

2. The unified codec device of claim 1, wherein the decoding control unit is configured to receive a control parameter from one of the plurality of functional units and provide the control parameter to another of the plurality of functional units for processing the input data.

3. The unified codec device of claim 1, wherein the functional group comprises:
a parsing and decoding (PD) functional group consisting of a plurality of PD functional units and configured to extract a control parameter from the input data in accordance with a PD operation control based on the connection relation set by the decoding control unit, the PD functional group further configured to process the input data and output the processed data in units of macroblocks; and
a macroblock-based (MB) functional group consisting of a plurality of MB functional units and configured to output image data by processing the data output by the PD functional group in accordance with a MB operation control based on the connection relation set by the decoding control unit and the extracted control parameter.

4. The unified codec device of claim 3,
wherein the PD functional group is configured to extract a connection control display value from the input data and provide the connection control display value to the decoding control unit, and
wherein the decoding control unit is configured to use the control connection display value to control an operation of a functional unit included in at least one of the PD functional group and the MB functional group.

5. The unified codec device of claim 1, wherein the decoding control unit comprises:
a connection control unit configured to set the connection relation by interpreting the connection information and control a sequential activation of the at least two of the plurality of functional units, the at least two of the plurality of functional units comprising a PD functional unit and a MB functional unit; and
a process control unit configured to receive from one of the PD functional unit and the MB functional unit a control parameter included in a header of the input data or generated through processing the input data, the process control unit further configured to deliver the corresponding control parameter to a corresponding one of the plurality of functional units.

6. The unified codec device of claim 1, wherein the decoding control unit is configured to
determine whether the connection control display value extracted from the input data satisfies the branch condition information, and
select one of a plurality of MB functional units, among a plurality of MB functional units having a parallel connection, to process the input data.

7. The unified codec device of claim 3,
wherein the control parameter comprises a control signal (CS) and context information (CI),
wherein the control signal instructs whether a function of one of the plurality of MB functional units is to be executed, and
wherein the context information is information used when executing the function by the one of the plurality of MB functional units.

8. The unified codec device of claim 7, wherein the control signal (CS) comprises at least one selected from the group consisting of an AC prediction flag, a coded block pattern, a quantization scale value, a data partition flag, an image size and a short video header flag.

9. The unified codec device of claim 7, wherein the decoding control unit is configured to deliver the control parameter to each of the plurality of MB functional units.

10. A method of unifying codecs, the method comprising:
(a) setting a connection relation among a plurality of functional units by interpreting connection information obtained from input data;
(b) instructing, by the decoding control unit, at least one of a plurality of functional units to process the input data in accordance with a process order determined by the connection relation; and
(c) processing, by the instructed at least one functional unit, the input data in accordance with a predetermined process method,
wherein the connection information consists of branch condition information and connection information related to serial and parallel connections between the plurality of functional units.

11. The method of claim 10, wherein the steps (b)-(c) are repeated until the input data is restored as image data.

12. The method of claim 10, further comprising:
in step (b) or prior to step (b), determining, by the decoding control unit, whether a connection control display value extracted from the input data by one of the plurality of functional units satisfies the branch condition information; and
if the connection control display value does satisfy the branch condition information, selecting another one of a plurality of functional units to process the input data, the another functional unit having a parallel connection.

13. The method of claim 10,
wherein step (b) further comprises providing a control parameter for processing the input data to the instructed at least one functional unit, and
wherein step (c) further comprises processing, by the instructed at least one functional unit, the input data using the control parameter.

14. The method of claim 13,
wherein the control parameter comprises a control signal and context information,
wherein the control signal instructs whether a function of the instructed at least one functional unit is to be executed, and
wherein the context information is information used when executing the function by the instructed at least one functional unit.

15. The method of claim 13, further comprising:
processing, by the decoding control unit, the control parameter and delivering the processed control parameter to the instructed at least one functional unit.

* * * * *